(12) United States Patent
Glogovsky, Jr. et al.

(10) Patent No.: US 9,135,204 B1
(45) Date of Patent: Sep. 15, 2015

(54) HARDENED DVI INTERFACE

(75) Inventors: Joseph Glogovsky, Jr., Marion, IA (US); John A. Shaw, Cedar Rapids, IA (US); Darrell G. Peterson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 38 days.

(21) Appl. No.: 13/470,796

(22) Filed: May 14, 2012

(51) Int. Cl.
*G06F 13/40* (2006.01)
*G06F 3/14* (2006.01)
*H04L 25/02* (2006.01)
*H04L 12/10* (2006.01)

(52) U.S. Cl.
CPC .......... *G06F 13/4072* (2013.01); *G06F 3/1454* (2013.01); *H04L 25/0272* (2013.01); *H04L 12/10* (2013.01)

(58) Field of Classification Search
CPC ... H04L 69/08; H04L 12/10; H04L 12/40032; H04B 10/2504; H04B 10/25759; H04B 10/12; H04N 7/173; G06F 3/1454

USPC .......................................................... 710/106
See application file for complete search history.

(56) References Cited

U.S. PATENT DOCUMENTS

| | | | |
|---|---|---|---|
| 2008/0005433 A1* | 1/2008 | Diab et al. | 710/106 |
| 2011/0150487 A1* | 6/2011 | Walter | 398/115 |
| 2012/0210384 A1* | 8/2012 | Cirstea et al. | 725/127 |

* cited by examiner

*Primary Examiner* — Idriss N Alrobaye
*Assistant Examiner* — Brooke Taylor
(74) *Attorney, Agent, or Firm* — Angel N. Gerdzhikov; Donna P. Suchy; Daniel M. Barbieri

(57) ABSTRACT

A hardened DVI transmitter includes a differential driver to convert a ground-up DVI signal into a balanced DVI signal. The balanced DVI signal is transmitted to a DVI compliant cable, through one or more transformers. Transformers effectively remove direct current interference from sources such as lightning. A hardened DVI receiver receives the balanced DVI signal, from the DVI compliant cable, through one or more complimentary transformers. The balanced DVI signal is then converted back to a ground-up DVI signal. By this method, DVI compliant signals may be sent through DVI cables longer than ten meters, and survive interference from lightning.

17 Claims, 4 Drawing Sheets

HARDENED DVI INTERFACE

GOVERNMENT LICENSE RIGHTS

The U.S. Government has a paid-up license in this invention and the right in limited circumstances to require the patent owner to license others on reasonable terms as provided by the terms of the E-2C Hawkeye project awarded by the United States Navy.

FIELD OF THE INVENTION

The present invention is directed generally toward digital visual interface (DVI) and more particularly toward DVI hardened for use in aircraft.

BACKGROUND OF THE INVENTION

The Digital Visual Interface (DVI) and High Definition Multimedia Interface (HDMI) have become very popular digital interfaces in the consumer electronics arena for high definition video and audio with personal computers and in-home theater systems. Due to the off-the-shelf availability of hardware and software that support these interfaces, DVI and HDMI present the opportunity to provide the aircraft industry and the war-fighter with high-quality high-definition video capabilities today.

The signaling format, cable/connector system specifications, and the resulting off-the-shelf cable assemblies for DVI and HDMI were designed to meet the electromagnetic interference (EMI) requirements stated in Part 15 of the Federal Communication Commission (FCC) Rules and Regulations for digital devices, as well as those applicable under the electromagnetic compatibility (EMC) Directive.

The EMI requirements for defense/aerospace equipment are much more severe than those applicable under FCC Part 15 and the EMC Directive. For example, defense/aerospace emissions requirements, such as those called out in MIL-STD-461 E and DO-160E, in addition to being one or two orders of magnitude more stringent, often extend to frequencies below 2 MHz and always require peak detection, compared to a low frequency bound of 30 MHz and the allowance for quasi-peak and average detection found in the non-defense/aerospace sector radiated emissions requirements. Radiated radio-frequency (RF) susceptibility requirements for defense/aerospace equipment are typically at the 200 V/m level, with requirements as high as 8 kV/m in the 1 to 2 GHz band for Army helicopter equipment. Non-defense/aerospace equipment is typically tested at 5 to 10 V/m per standards applicable to the EMC Directive for consumer electronics.

Defense/aerospace equipment is often also subjected to connector pin injected transients with open circuit voltages and currents typically in the ranges of 600 volts and 25 amperes, respectively, and cable or ground injected transients with amplitudes typically in the range of 600 to 1000 Amperes per DO-160E for civil aircraft equipment approval testing. These "indirect effects" transients are representative of the environment produced on the aircraft wires and cables when lightning strikes the aircraft vicinity. Since the equipment on defense/aerospace platforms is often necessary for safe flight and/or mission accomplishment, damage and/or upset from an occasional transient is often an unacceptable consequence.

Consequently, it would be advantageous if an apparatus existed that is suitable for transmitting with a DVI interface in a defense/aerospace environment.

SUMMARY OF THE INVENTION

Accordingly, the present invention is directed to a novel method and apparatus for transmitting with a DVI interface in a defense/aerospace environment.

One embodiment of the present invention is an apparatus having a differential driver and a centerline transformer. The differential driver converts a DVI signal to a signal balanced around a ground. The transformer removes direct current interference.

Another embodiment of the present invention is a method for converting a DVI signal. The method includes converting a "ground up" DVI signal into a signal balanced around ground with a differential driver. The method also includes filtering the balanced signal through a centerline transformer to filter out direct current interference. The balanced, filtered signal may be sent through a DVI compliant cable.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
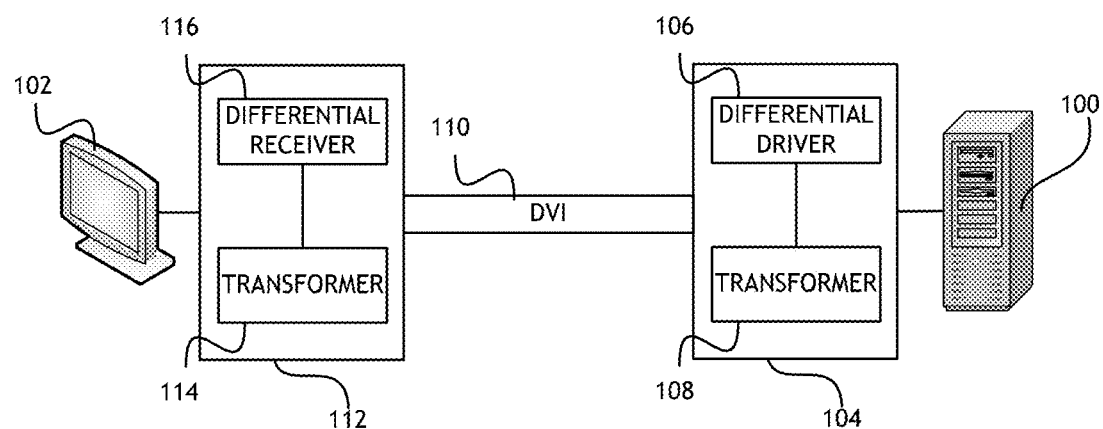
FIG. 1 shows a block diagram of a system for sending signals to a display device with a DVI interface.

Referring to FIG. 1, a block diagram of a system for sending DVI compliant signals from a computing device 100 to a display device 102 is shown. The system may include a hardened DVI transmitter 104 connected to the computing device 100. The hardened DVI transmitter 104 may convert a DVI signal from a ground-up signal to a balanced signal with a differential driver 106. A balanced signal is a complimentary signal pair where each complimentary signal comprises an equal and opposite voltage with reference to a ground. The hardened DVI transmitter 104 may then send the balanced signal through one or more transformers 108 and into a DVI compliant cable 110. The transformers 108 may filter out direct current interference and noise by preventing any direct current signals from passing through the transformer 108, including direct current due to lightning.

The DVI compliant cable 110 may be connected to a hardened DVI receiver 112. The hardened DVI receiver 112 may include one or more complimentary transformers 114 and a differential receiver 116. The complimentary transformers 114 may filter out direct current interference including direct current due to lighting. The differential receiver 116 may receive the balanced signal, through the complimentary transformer 114. Because the balanced signal is a complimentary signal pair balanced around ground, the complimentary signal is not filtered out by the complimentary transformers 114. The differential receiver 116 may convert the balanced signal to a standard ground-up DVI signal.

By converting a ground-up signal into a balanced signal in a differential driver 106 before transmission, transmitting the balanced signal through one or more transformers 108 and complimentary transformers 114, and converting the balanced signal back to a ground-up signal in a differential receiver 116, a DVI signal may be transmitted more than ten meters. Furthermore, the transformer 108 and complimentary transformer 114 prevent interference from direct current such as lightning. Such a system may be useful in aircraft applications where interference from lighting is both common and dangerous, and where separation between displays and computing devices is desirable.

Figure 2:
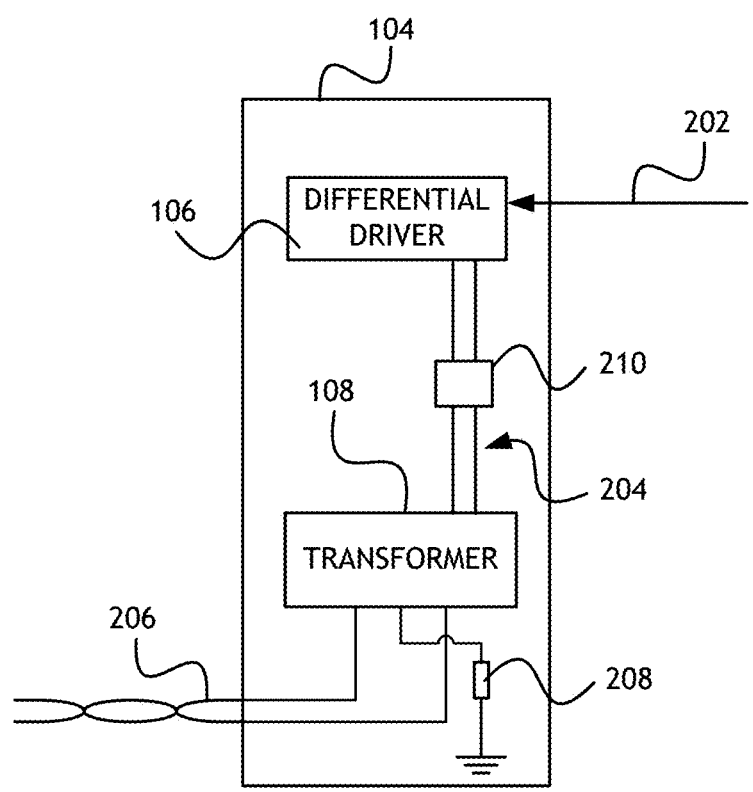
FIG. 2 shows a block diagram of an apparatus for converting and sending DVI compliant signals in an aerospace application.

Referring to FIG. 2, a block diagram of a hardened DVI transmitter 104 is shown. The hardened DVI transmitter 104 may include a differential driver 106 to convert a ground-up DVI signal into a balanced DVI signal. The differential driver 106 may also add pre-emphasis to high frequency components of the balanced DVI signal. The differential driver 106 may be connected to a computing device attempting to output a DVI signal 202 to a display device. The differential driver 106 may convert the DVI signal 202 from a ground-up signal (a signal measured in reference to a ground) to a balanced signal (a signal having two complimentary components, each measured in reference to a ground such that the total voltage of the signal at any given instant is substantially zero). The balanced signal may be transmitted through one or more complimentary wire pairs 204 to one or more transformers 108. Each complimentary wire in each complimentary wire pair 204 may comprise a loop carrying one component of the balanced signal. The balanced signal may be processed by one or more automatic gain control (AGC) circuits 210. In an AGC circuit 210, an average output signal level is fed back to adjust the gain to an appropriate level for a range of input signal levels; for example, the AGC circuits 210 in the present invention may ensure that the signals transmitted by the complimentary wire pairs 204 are within acceptable DVI limits. A person skilled in the art may appreciate that the AGC circuit 210 may be integrated into the differential driver 106.

Each complimentary wire pair 204 may further engage a transformer 108 so as to induce a current in corresponding wires in a DVI compliant cable 206 through means known in the art. One skilled in the art may appreciate that each complimentary wire pair 204 may utilize a separate transformer 108 such that the hardened DVI transmitter 104 includes one transformer 108 per line. One skilled in the art may further appreciate that while one complimentary wire pair 204 is shown, more than one complimentary wire pair 204 may be utilized.

Commercial DVI relies on an open-collector driver/receiver circuit. When no device is connected the DVI port in an open-collector circuit, no power is transmitted because no current is available to flow. Current is supplied at the display side as a pull-up to a voltage reference for the interface. An open-collector circuit is not capable of passing through a signal transformer as the reference pull up is to a direct current voltage source. The present invention converts the open-collector ground-up circuit into a balanced differential circuit centered around ground. Current flow is kept out of the ground return due to the nature of a differential signal; therefore, the present invention features improved isolation and protection from interference as compared to prior art DVI interfaces.

The one or more transformers 108 may include one or more filter circuits 208 connecting one or more wires in the one or more transformers 108 to a ground. The filter circuits 208 may filter out electrical interference such as electrical current due to lightning. The one or more filter circuits 208 may include a resistive element for dissipating energy due to lightning.

One skilled in the art may appreciate that the one or more transformers 108 and the DVI compliant cable 206 may include corresponding interfaces to facilitate a non-permanent connection between the transformers 108 and the DVI compliant cable 206. When a DVI complaint cable 206 is connected to the transformer 108, individual wires in the DVI compliant cable 206 may engage transformer elements to form wire loops to carry signals induced by components of the balanced signal. Transformers 108 may be organized such that substantially adjacent wires in the DVI compliant cable 206 carry corresponding signals and return signals for one balanced signal.

Whereas, prior art DVI may utilize shielding in the DVI cable for signal return, the present invention utilizes adjacent wires and corresponding wire pairs. Utilizing adjacent wire pairs to carry complimentary signals improves signal fidelity by cancelling out the effects of external interference. A system utilizing the present invention may transmit DVI compliant signals through a DVI compliant cable more than ten meters. One skilled in the art may appreciate that, while DVI signals are specifically discussed, the teachings of the present invention are useful for transmission of signals other than DVI; for example, HDMI.

Figure 3:
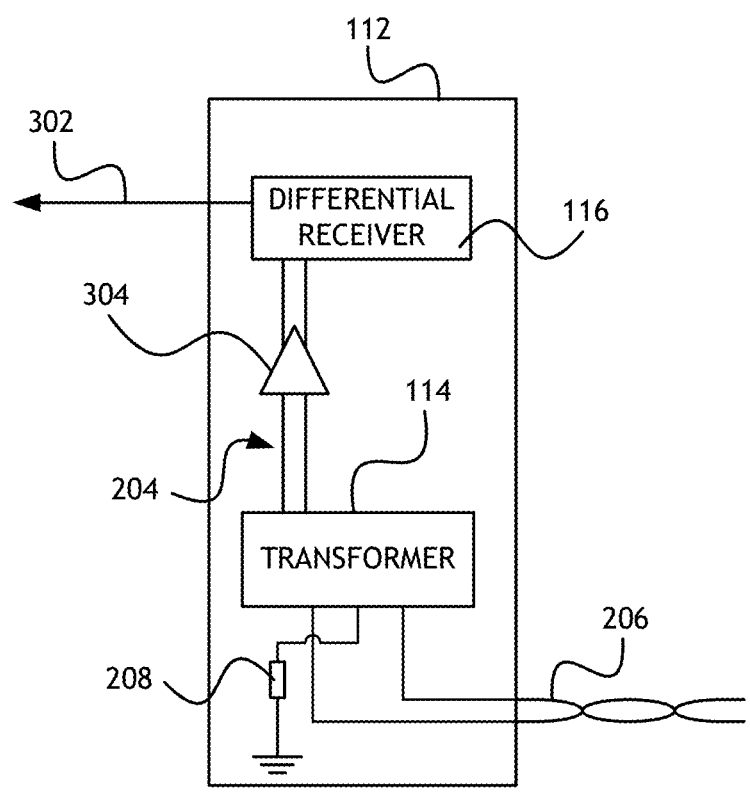
FIG. 3 shows a block diagram of an apparatus for receiving and converting DVI compliant signals in an aerospace application.

Referring to FIG. 3, a block diagram of a hardened DVI receiver 112 is shown. The hardened DVI receiver 112 may include one or more complimentary transformers 114. The complimentary transformers 114 may receive one or more balanced DVI signals through a DVI compliant cable 206. Each complimentary transformer 114 may engage two wires in the DVI compliant cable 206 carrying the signal and return signal for one component of a balanced signal. The signal and corresponding return signal from the two wires in the DVI compliant cable 206 may induce a current in the complimentary wire loop through means known in the art. One skilled in the art may appreciate that the number of complimentary transformers 114 may be governed by the number of balanced signals transmitted through the DVI compliant cable with on complimentary transformer 114 per line. Each complimentary wire pairs 204 may carry components of the balanced DVI signal from each of the one or more complimentary transformers 114 to the differential receiver 116. The differential receiver 116 may convert the balanced DVI signal to a ground-up DVI signal 302, compatible with a DVI compatible display device. The hardened DVI receiver 112 may also include a cable equalizer circuit 304 to recover high frequency components of the balanced DVI signal that may have become attenuated through transmission in the DVI compliant cable 206.

Figure 4:
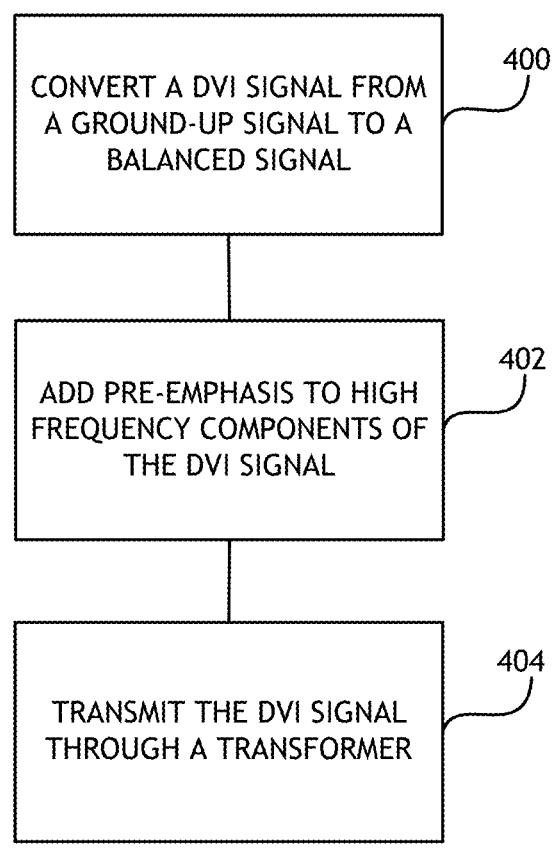
FIG. 4 shows a flowchart of a method for converting and sending DVI compliant signals in an aerospace application.

Referring to FIG. 4, a flowchart for converting and transmitting DVI compliant signals is shown. A DVI signal may be converted 400 from a ground-up signal to a balanced signal using a differential driver. The differential driver may add 402 pre-emphasis to high frequency components of the balanced DVI signal. Conversion to a balanced DVI signal allows the signal to be transmitted in signal pairs, through wires in a DVI compliant cable, such that components of the balanced DVI signal may be transmitted through complimentary pairs of wires. Transmitting components of the balanced DVI signal through complimentary pairs of wires reduces the electromagnetic signature of the signal and allows interference to be filtered out more effectively. Adding 402 pre-emphasis to high frequency components may improve fidelity of the transmitted signal because high frequency components are likely to be attenuated when transmitted through a DVI compliant cable longer than ten meters.

The balanced signal may then be transmitted 406 from the differential driver to a DVI compliant cable through one or more transformers. Each of the one or more transformers may transmit a balanced DVI signal from a wire loop connected to the differential driver to a wire loop incorporating wires in the DVI compliant cable. The one or more transformers segregate the transmitting circuitry from the DVI compliant cable, and therefore from electrical interference due to lightning.

Figure 5:
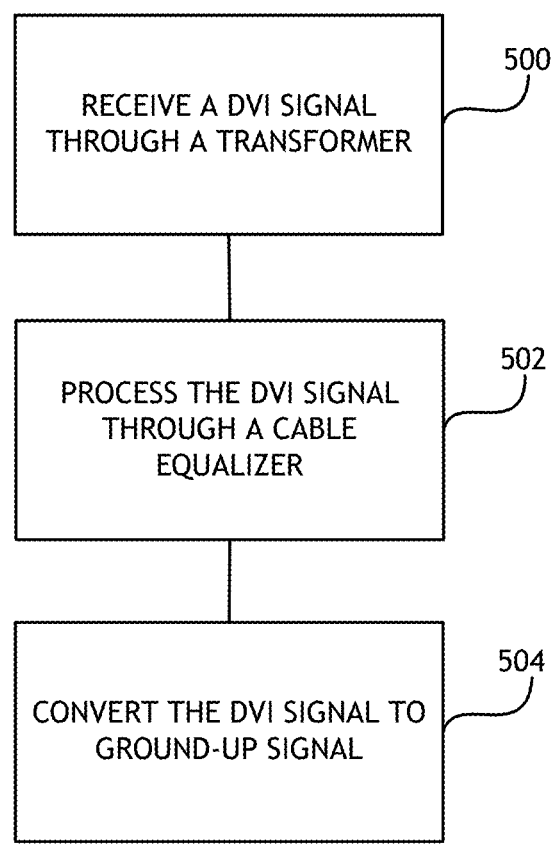
FIG. 5 shows a flowchart of a method for receiving and converting DVI compliant signals in an aerospace application.

Referring to FIG. 5, a flowchart for receiving and converting DVI compliant signals is shown. A balanced signal may be received 500 by a differential receiver from a DVI compliant cable through one or more complimentary transformers. Each of the one or more complimentary transformers may receive a balanced DVI signal from a wire loop connected to the DVI compliant cable and transmit each half of the balanced DVI signal to a differential receiver. The one or more transformers segregate the receiving circuitry from the DVI compliant cable, and therefore from electrical interference due to lightning.

Transmission through a DVI compliant cable longer than ten meters may cause attenuation of high frequency components of the balanced DVI signal. Portions of the balanced DVI signal may be processed 502 by one or more equalizer circuits to recover high frequency components.

The balanced DVI signal may then be converted 504 from a balanced signal to a ground-up signal using a differential receiver. The ground-up DVI signal may then be delivered to a DVI compliant display device.

By these methods, a DVI signal may be transmitted through a DVI compliant cable longer than ten meters. In an aerospace application, DVI compliant devices may be shielded from lightning and other interference common in aerospace applications.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for transmitting a digital visual interface (DVI) signal, comprising:
    a differential driver;
    a differential receiver;
    one or more transformers, each of the one or more transformers connected to the differential driver and differential receiver;
    and at least one cable equalizer interposed between one of the one or more transformers and the differential receiver;
    wherein:
        the cable equalizer circuit is configured to recover high frequency components of at least one of the one or more balanced DVI signals;
        the differential driver is configured to receive one or more ground-up DVI signals;
        the differential driver is configured to convert the one or more ground-up DVI signals into one or more balanced signals, each comprising two waveforms of substantially similar magnitude but opposite voltage with reference to a ground;
        the one or more transformers are configured to receive the two waveforms and transmit the two waveforms to a DVI compliant cable; and
        the differential driver and one or more transformers are configured to remove all direct current signals before transmitting the two waveforms via the DVI compliant cable.

2. The apparatus of claim 1, further comprising one or more automatic gain control circuits connected to the differential driver, configured to:
    adjust the gain of one or more of the balanced signals to within DVI limits; and
    transmit said one or more balanced signals to the one or more transformers.

3. The apparatus of claim 1, wherein at least one of the one or more transformers is a center tap transformer.

4. The apparatus of claim 3, further comprising a resistive element connected to a center tap of the center tap transformer.

5. The apparatus of claim 3, further comprising at least one filter circuit connected to a center tap of the center tap transformer, wherein the at least one filter circuit is configured to filter out interference due to lightning.

6. The apparatus of claim 1, wherein the differential driver is further configured to add pre-emphasis to high frequency components of at least one of the one or more balanced DVI signals.

7. The apparatus of claim 1, further comprising a DVI cable interface connected to the one or more transformers, wherein:
    the DVI cable interface is configured to engage a DVI compliant cable such that each of one or more wire pairs in the DVI complaint cable engaging terminals of one of the one or more transformers form a twisted pair; and the wire pairs in the DVI compliant cable carrying the two waveforms of are configured to reduce the electromagnetic signature of the one or more balanced signal.

8. The apparatus of claim 7, wherein the differential driver, one or more transformers and DVI cable interface are configured to maintain a signal integrity of the balanced signal when the balanced signal is transmitted through a DVI compliant cable more than ten meters.

9. An apparatus for receiving a digital visual interface (DVI) signal, comprising:
    a differential receiver;
    one or more transformers, each of the one or more transformers connected to the differential receiver; and
    at least one cable equalizer interposed between one of the one or more transformers and the differential receiver, wherein:
        the differential receiver is configured to receive one or more balanced DVI signals;
        the cable equalizer circuit is configured to recover high frequency components of at least one of the one or more balanced DVI signals;

the differential receiver is configured to convert the one or more balanced DVI signals into one or more ground-up DVI signals;

and the one or more transformers are configured to receive the one or more balanced DVI signals and transmit said one or more balanced DVI signals to the differential receiver; and the differential receiver and one or more transformers are configured to remove all direct current components from the one or more balanced DVI signals.

10. The apparatus of claim 9, wherein at least one of the one or more transformers is a center tap transformer.

11. The apparatus of claim 10, further comprising a resistive element connected to a center tap of the center tap transformer.

12. The apparatus of claim 10, further comprising at least one filter circuit connected to a center tap of the center tap transformer, wherein the at least one filter circuit is configured to filter out interference due to lightning.

13. The apparatus of claim 9, further comprising a DVI cable interface connected to the one or more transformers, wherein:

the DVI cable interface is configured to engage a DVI compliant cable such that each of the wire pairs in the DVI complaint cable engaging terminals of one of the one or more transformers form a twisted pair; and the wire pairs in the DVI compliant cable carrying the two waveforms are configured to reduce the electromagnetic signature of the one or more balanced signal.

14. The apparatus of claim 13, wherein the differential receiver, one or more transformers and DVI cable interface are configured to maintain a signal integrity of the balanced signal when the balanced signal is received through a DVI compliant cable more than ten meters.

15. A method for transmitting a digital visual interface (DVI) signal comprising:

receiving one or more ground-up DVI signals from a computing device;

converting said one or more ground-up DVI signals to one or more balanced DVI signals, wherein each of the one or more balanced DVI signals comprises a first component waveform having positive voltage with reference to a ground;

and a second component waveform having negative voltage with reference to a ground;

adding pre-emphasis to a high frequency component of the one or more balanced DVI signals;

removing all direct current components from the one or more balanced DVI signals with a differential receiver and one or more transformers; and transmitting the one or more balanced DVI signals to a DVI compliant cable through one or more transformers.

16. The method of claim 15, further comprising:

receiving one or more balanced DVI signals from a DVI compliant cable through one or more complimentary transformers; and converting said one or more balanced DVI signals to one or more ground-up DVI signals.

17. The method of claim 16, further comprising recovering high frequency components of the one or more balanced DVI signals with a cable equalizer circuit.

* * * * *